United States Patent [19]
Chiu

[11] Patent Number: 4,921,639
[45] Date of Patent: May 1, 1990

[54] ULTRASONIC HUMIDIFIER

[76] Inventor: Bernard Chiu, 29 Davis Farm Rd., Ashland, Mass. 01721

[21] Appl. No.: 268,712

[22] Filed: Nov. 9, 1988

[51] Int. Cl.$^5$ ............................................. B01F 3/04
[52] U.S. Cl. ....................................... 261/67; 261/81; 261/DIG. 48; 239/102.2; 137/453; 137/454; 137/256
[58] Field of Search ................... 261/81, DIG. 48, 67; 239/102.2; 237/453, 454, 256

[56] References Cited
U.S. PATENT DOCUMENTS

| | | | |
|---|---|---|---|
| 1,835,362 | 12/1931 | Williams et al. | 137/454 |
| 2,078,204 | 4/1937 | Manning et al. | 137/453 |
| 2,711,268 | 6/1955 | Cannella | 222/145 |
| 3,656,507 | 4/1972 | Martinez | 137/454 |
| 3,927,804 | 12/1975 | De Man | 222/136 |
| 3,930,598 | 1/1976 | Slagle | 222/145 |
| 4,033,483 | 7/1977 | Niedorf | 137/453 |
| 4,238,425 | 12/1980 | Matsuoka et al. | 261/DIG. 48 |
| 4,663,091 | 5/1987 | Seo | 261/DIG. 48 |

Primary Examiner—Tim Miles

[57] ABSTRACT

An ultrasonic humidifier having a pair of water tanks which release their water into a reservoir in a staggered sequence. The staggered emptying of the water tanks enables the tanks to be refilled in a more efficient manner. Several different embodiments are disclosed.

5 Claims, 3 Drawing Sheets

ULTRASONIC HUMIDIFIER

BACKGROUND OF THE INVENTION

The present invention relates generally to ultrasonic humidifiers, and, more particularly, to ultrasonic humidifiers of the type having a plurality of removable water tanks for holding the water which is used to produce a mist.

During the winter season when temperatures decline below 32 degrees F. the humidity level in homes and offices generally drop below 25 per cent. This low humidity condition can cause a seasonal occuring affliction called rhinitis sicca, more commonly known as dry nose and/or throat. This affliction can be easily overcome by increasing the moisture level in the home or office.

In the past, steam vaporizers were utilized to add moisture to the surrounding air. However, in recent years, the steam vaporizer has been replaced with the humidifier.

One well known type of humidifier relies upon a moving belt/fan mechanism to turn water into a cool mist. Another type of known humidifier utilizes a heating element to generate a warm mist. Still another type of known humidifier uses a small electronic component called a transducer which is capable of transforming electrical energy into mechanical energy for generating a cool mist. More specifically, the transducer includes a vibrating part called a nebulizer which vibrates quietly at greater than 1 1/2 million times per second in order to convert water into a fine, cool mist. Humidifiers using a nebulizer for generating a cool mist are more commonly referred to as ultrasonic humidifiers and are the latest advance in the humidifier field.

Ultrasonic humidifiers usually incorporate therein a removable water tank or container for holding a supply of water. The tank contains a vale which controls the flow of water from the tank into a reservoir at the bottom of the humidifier. The nebulizer for churning the water into a fine, cool mist is usually located at the bottom of the reservoir. When the water tank is fully or partly empty it is simply lifted out, taken to a source of water such as a water faucet, refilled and then returned for subsequent use. An example of such a humidifier is the Model No. HM-310 Ultrasonic Humidifiers manufactured by Holmes Products Corporation of Holliston, MA.

In some ultrasonic humidifiers the water capacity is increased by providing a pair of water tanks as opposed to a single water tank. The water is unloaded from the tanks simultaneously with both tanks starting to empty their water supply at the same time and becoming completely empty at the same time. Refilling one tank before the other will have no effect on the emptying of water from the other tank. An example of a two tank ultrasonic humidifier is the Model No. HM-1500 Ultrasonic Humidifier manufactured by Holmes Products Corporation of Holliston, MA. The main advantage of having two water tanks rather than one is that the individual tanks are smaller and easier to handle than one large tank. As can be appreciated, however, the overall advantages of two tanks as opposed to one tank have not been maximized.

SUMMARY OF THE INVENTION

An ultrasonic humidifier constructed according to the teachings of the present invention includes a housing, the housing having a bottom wall, the bottom wall having a reservoir, a nebulizer in the reservoir for churning up the water in the reservoir and a pair of removable water tanks for providing water to the reservoir, the tanks being arranged so that one tank starts to release its water into the reservoir before the other and consequently becomes fully empty before the other.

The present invention may be in the form of a number of different embodiments for emptying the water from the two tanks in a staggered sequence. The advantages will become readily apparent. Although the system of emptying the water tanks in a staggered sequence may take on a number of alternate embodiments, all embodiments rely upon either positioning the water tanks relative to the reservoir or designing the outlets on the water tanks to produce the staggered emptying. More specifically, each water tank includes at the bottom thereof an outlet capped off with a valve which is opened when a protrusion formed in the reservoir engages the valve. In a conventional two tank humidifier (prior art), the tanks are seated in the humidifier at the same height relative to the reservoir. According to this invention, however, one of the water tanks is disposed slightly above the other. As a result the water will start to dispense from the higher of the two tanks prior to the other since it is the back pressure of the water located within the humidifier which actually starts and stops the flow of water from the tank. Another embodiment of this invention which accomplishes the staggered emptying of tanks involves making one valve outlet at a higher level than the other. The valves used in these tanks generally incorporate a notch or cutout section therein. Accordingly, dimensioning one notch of one at a greater height than the other will also effect sequential emptying of the water storage tanks. Furthermore, since the outlet valves are generally located within a refill cap removably secured to the outlet of the water storage tanks, designing the height of the valves differentialy or placing a spacer within the cap can also provide sufficient height difference between the water storage tanks to effect sequential emptying thereof. Since only a small height difference, that is, less than 0.15 inches will enable the uneven emptying to take place, it is readily apparent that only a minor modification of existing humidifier structure need be undertaken to subsequentially enhance the operation of such cool mist humidifiers.

It is therefore an object of this invention to provide a new and improved humidifier.

It is another object of this invention to provide a multi-task ultrasonic humidifier which is constructed to enable the staggered emptying of the water contained within the tanks.

It is a further object of this invention to provide a two tank ultrasonic humidifier in which one tank will fully empty before the other.

It is a still further object of this invention to provide a humidifier which is economical to produce and which can be readily mass produced using conventional, currently available components.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENTS

Figure 1:
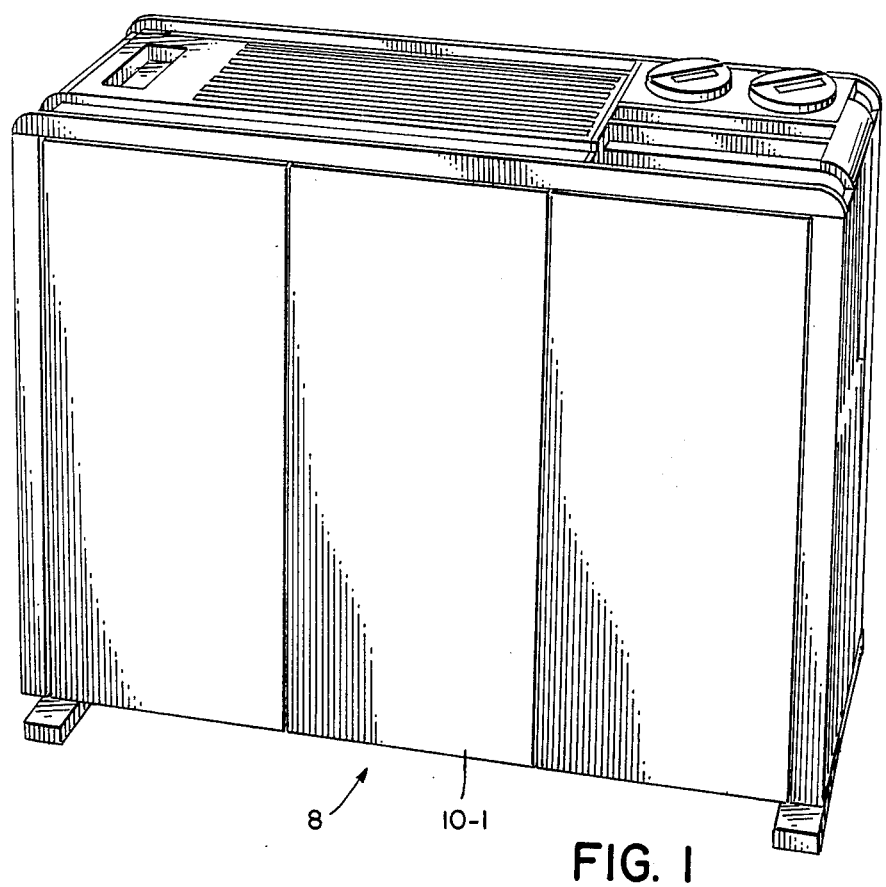
FIG. 1 is a perspective view taken from the front of a multi-tank ultrasonic humidifier constructed according to this invention.
Figure 2:
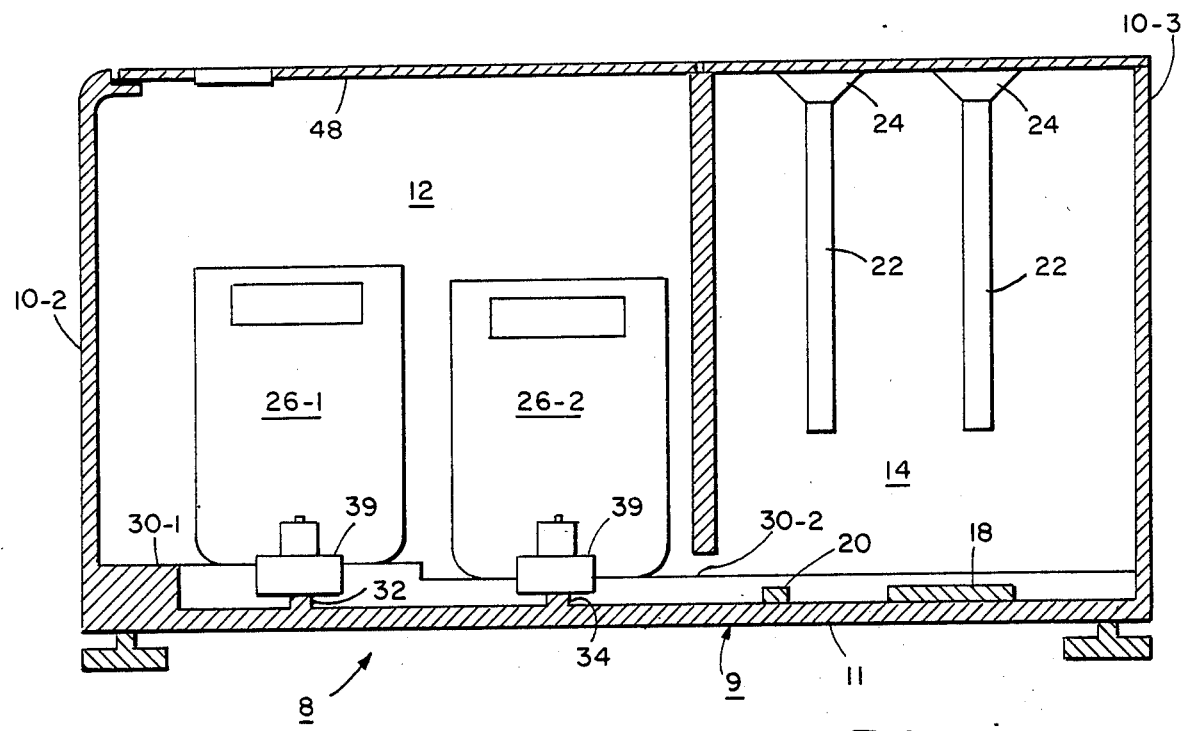
FIG. 2 is a front section view of the humidifier shown in FIG. 1.
Figure 3:
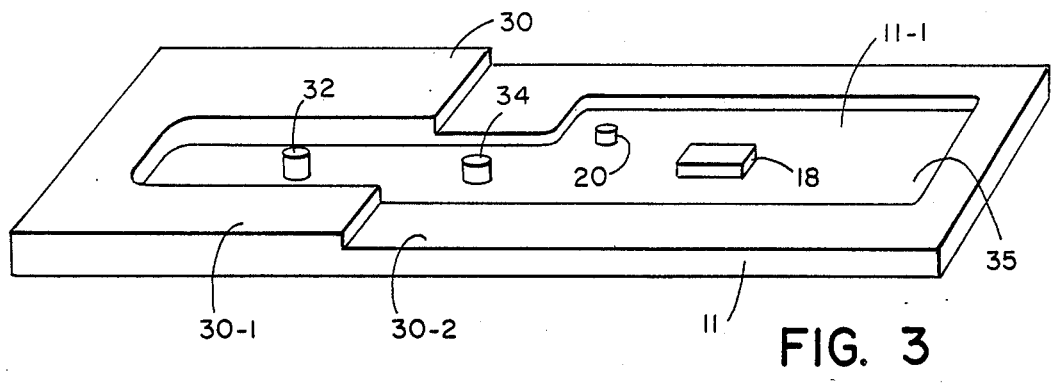
FIG. 3 is a perspective view of the base wall of the humidifier shown in FIG. 2.

Referring now to the drawings there is shown an ultrasonic humidifier 8 constructed according to the teachings of the present invention. Portions of humidifier 8 not considered pertinent to the invention are not shown or discussed.

Humidifier 8 includes a housing 9 having a front wall 10-1, a pair of side walls 10-2 and 10-3 and a bottom wall 11. Wall 11 includes a recessed or cavity portion which defines a reservoir 11-1. Housing 9 is partitioned by a divider wall 11-2 into two compartments designated by the numerals 14 and 12, respectively. Compartment 14 is a misting compartment and contains the misting components generally associated with an ultrasonic humidifier for producing and emitting a mist. The other compartment 12 is a water storage compartment 12 which holds a supply of water which is used to produce a mist. As can be seen, divider wall 11-2 does not extend down into reservoir 11-1.

More specifically, misting chamber 14 includes a transducer 18 having a nebulizer for churning water to produce a mist, a float switch 20 for activating a switch for turning off transducer 18 if there is no water in reservoir 11-1, a pair of mist channels 22 for receiving the mist produced and a pair of nozzles 24 through which the mist is emitted. The operation of mist chamber 14 is conventional.

Compartment 12, which is adjacent to compartment 14, includes a pair of identical removable water tanks 26-1 and 26-2 for supplying water to reservoir 11-1. Tanks 26 are seated on the top surface 30 of wall 11 adjacent reservoir 11-1.

A pair of protrusions 32 and 34 extend up from the bottom surface 35 of reservoir 11-1. Each protrusion engages a valve 36 located in a cap 39 screwed into an opening at the bottom of the water tank 26 in a manner illustrated and described in detail hereinbelow. A demineralization cartridge (not shown) may be deposed in reservoir 11-1, to purify the water as it passes from compartment 14 to compartment 10.

As can be seen, top surface 30 of wall 11 is not flat but, instead is stepped so as to define two parts 30-1 and 30-2. Part 30-1, on which one tank 26-1 is seated, is slightly greater in height (approximately 0.125-0.25 inches) than portion 30-2 where the other tank 26-2 is seated. Consequently, tank 26-1 is higher than tank 26-2 relative to bottom wall 35 of reservoir 11-1. The difference is wall height effects a staggered emptying of water from tanks 26 in a manner to be described in detail hereinbelow. Housing 9 includes a top plate 48 which is easily removable for access to water storage compartment 12. It may be hinged or as shown completely removable; however, the manner in which it is removable does not form part of the present invention.

Figure 4:
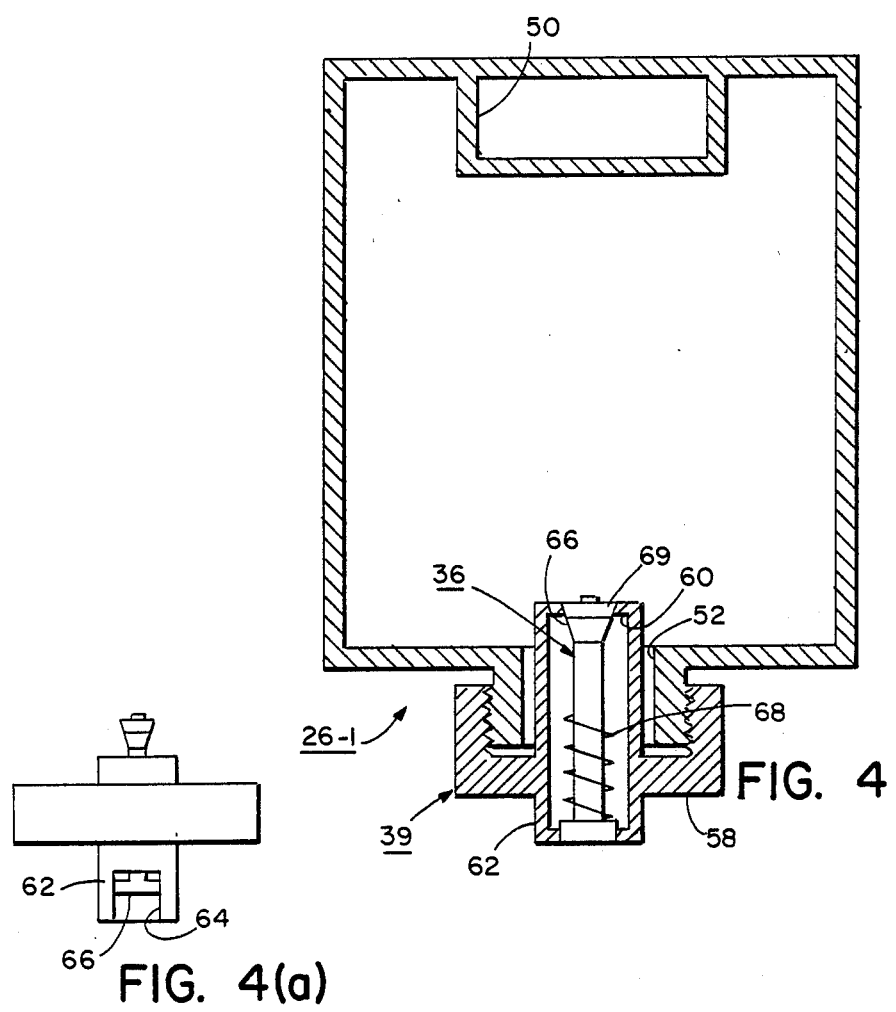
FIG. 4 is a front elevation view partly in section of one of the water tanks shown in the humidifier in FIG. 2.

Reference is now made to FIG. 4 of the drawings for a more detailed illustration of one of the two water tanks 26-1. Water tank 26-1 is made of any suitable type of plastic material, preferably transparent or at least translucent so that a person can see the water level therein. A handle 50 is formed at the top to aid in the removal and holding of the tank 26. At the lower end thereof is an opening 52 which is used both as a filling port and exit port. It should be noted, however, that it is possible to add a separate filling port and cap (not shown) at the top or side of tank 26 if so desired.

Figure 4A:
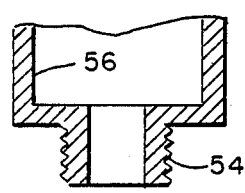
FIG. 4(a) is an enlarged view of the cap shown in FIG. 4.

Cap 39, clearly illustrated in FIGS. 4 and 4(a), encloses opening 52. More specifically, cap 39 is made up of a internally threaded cylindrically shaped cover 58 having a centrally longitudinally extending opening 60 formed within a protruding element 62. A notch or cutout portion 64 is formed at the base of protruding element 62. Valve 36 which is formed in cap 39 includes a plunger 66, biased to a closed position by a spring 68. A rubber washer-like element 69 is secured to the upper portion of plunger 55 in order to seal opening 60 when desired. FIG. 4 depicts valve 36 in its closed position while FIG. 4a depicts valve 36 in its open position. When tanks 26 are mounted in water storage compartment 14 protrusions 32/34 push plunger 66 in as shown in the drawings so as to open valve 36.

When both storage tanks 26 are resting properly within compartment 12 and protrusions 32 and 34 engage values 36 as shown in FIG. 1 of the drawings, tank 26-1 seated on surface 30-1 will start to empty prior to tank 26-2 on surface 30-2 since it is higher relative to wall 11-1 and become completely empty prior to tank 26-2.

In the embodiment of FIG. 1, water tank 26-1 is positioned higher than tank 26-2 (by approximately 0.0125-0.25 inches).

Other embodiments of the present invention are described hereinbelow for producing a staggered emptying of water from the water tanks without using a stepped tank supporting surface 30.

Figures 5A, 5B:
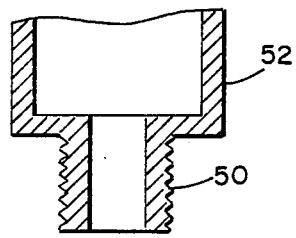
FIG. 5(a) through 5(c), 6(a) and 6(b) and 7(a) and 7(b) are views illustrating other embodiments of the invention.
Figure 5C:
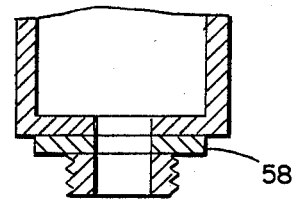

For example, FIGS. 5A and 5B illustrate an embodiment of the present invention in which the neck 50 of one water tank 52 is longer than the neck 54 of the other tank 56 thereby, in effect, raising the height of the outlet of tank 56 with respect to tank 56. As an alternative, a spacer or washer 58 as shown in FIG. 5C may be utilized with one of the water tanks 26 in order to lower the outlet level of one tank relative to the other.

Figure 6A:
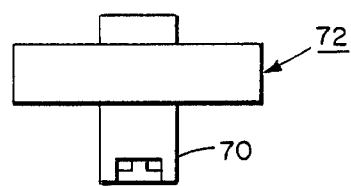
Figure 6B:
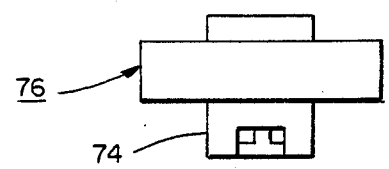

FIGS. 6A and 6B illustrate an embodiment of the present invention wherein the protruding element 70 of cap 72 is longer than the protruding element 74 of cap 76 in order to varying the outlet position of the two water tanks.

Figure 7A:
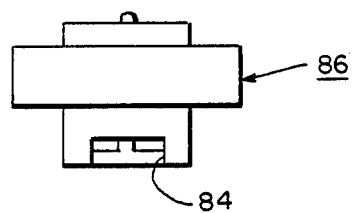
Figure 7B:
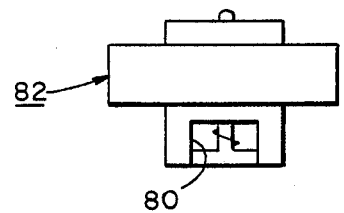

FIGS. 7A and 7B depict another embodiment of the present invention wherein the notch 80 in one cap 82 has a greater height than the notch 84 in the other cap 86, thereby effecting a different outlet level for the two water tanks.

In any case, the height differential in the FIGS. 5 through 7 embodiments need only be slight (0.125-0.25 inches) in order to effectively, release water from the tanks in a staggered arrangement.

The advantage of a staggered release of water from the two water tanks in the manner described in the present invention enables the user of the humidifier to only refill one tank that is almost fully empty rather than two tanks that are partly empty, if desired even though the refilling will occur more often than before.

Although this invention has been described with reference to particular embodiments, it will be understood that this invention is also capable of further and other embodiments within the spirit and scope of the appended claims.

What is claimed is:

1. A humidifier comprising:
   (a) a housing having a bottom wall, the bottom wall including a portion defining a reservoir,
   (b) a pair of removable water tanks, said water tanks being situated within said humidifier for supplying water to said reservoir, each tank having an opening at the bottom for the passage of water,
   (c) each water tank including valve means, the valve means in one water tank being slightly higher than the valve means of the other water tank relative to said reservoir,
   (d) each of said valve means comprising a cap encompassing said opening in said water storage tank, said cap having an opening, a movable spring biased plunger situated within said opening, a circumferential wall surrounding a portion of said plunger and extending from the bottom of said cap and a pair of notches on opposed sides of said circumferential wall, said pair of notches of said cap associated with one water storage tank being dimensioned of a larger height than said pair of notches associated with said cap of said other water storage tank so that water will flow therefrom in a staggered sequence, and
   (e) means for converting water in the reservoir into a mist.

2. A humidifier as defined in claim 1 wherein said larger height of said pair of notches of said cap associated with said one water storage tank is no more than 0.25 inches greater than the height of said notches of said cap associated with said other water storage tank.

3. A humidifier comprising:
   (a) a housing having a bottom wall, the bottom wall including a portion defining a reservoir,
   (b) a pair of removable water tanks, said water tanks being situated within said humidifier for supplying water to said reservoir, each tank having a neck at the bottom of the passage of water,
   (c) the neck in one tank being longer than the neck in the other tank so that water will flow therefrom in a staggered sequence, and
   (d) means for converting water in the reservoir into a mist.

4. A humidifier comprising:
   (a) a housing having a bottom wall, the bottom wall including a portion defining a reservoir,
   (b) a pair of removable water tanks, said water tanks being situated within said humidifier for supplying water to said reservoir, each tank having an opening at the bottom for the passage of water and valve mans for controlling the flow of water through the opening, each of said valve means comprising a cap encompassing said opening in said water storage tank, said cap including a protruding element, the protruding element in the cap in one tank being longer than the protruding element in the cap in the other tank so that water will flow from the two tanks in staggered sequence when the two tanks are disposed at the same level relative to the reservoir, and
   (c) means for converting water in the reservoir into a mist.

5. A humidifier comprising:
   (a) a housing having a bottom wall, the bottom wall including a portion defining a reservoir,
   (b) a pair of removable water tanks having necks, said water tanks being situated within said humidifier for supplying water to said reservoir, each tank having an opening at the bottom for the passage of water and valve means for controlling the flow of water through the opening, each of said valve means comprising a cap encompassing said opening in said water storage tank, one of said tanks including a spacer carried by its neck for raising the opening of said tank relative to the opening of the other tank when the two tanks are seated in the reservoir,
   (c) said water tanks being arranged relative to said reservoir so that water will flow therefrom in a staggered sequence, and
   (d) means for converting water in the reservoir into a mist.

* * * * *